Dec. 15, 1942.  R. J. FLEMING  2,304,904
OPHTHALMIC MOUNTING
Filed Aug. 8, 1941
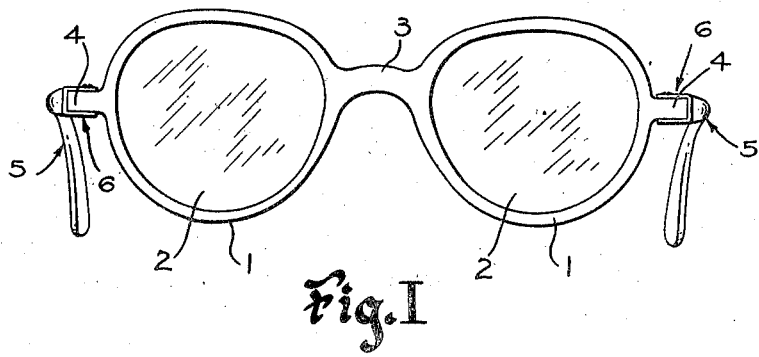
Fig. I
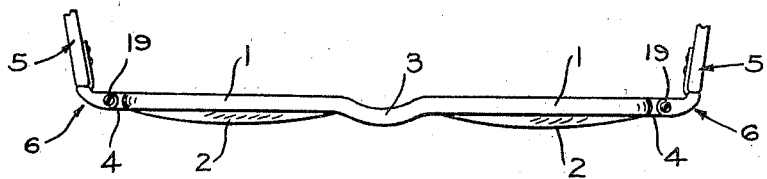
Fig. II
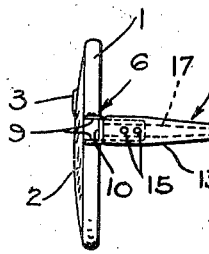
Fig. III
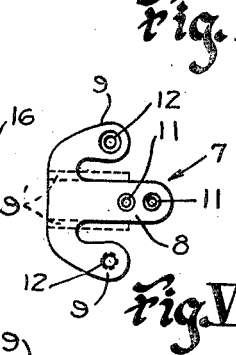
Fig. VIII
Fig. IV
Fig. IX
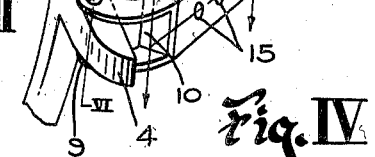
Fig. V  Fig. VI  Fig. VII
INVENTOR.
ROBERT J. FLEMING
BY Louis L. Gagnon
ATTORNEY.

Patented Dec. 15, 1942

2,304,904

UNITED STATES PATENT OFFICE 2,304,904

OPHTHALMIC MOUNTING

Robert James Fleming, Clerkenwell, England, assignor to American Optical Company, Southbridge, Mass., a voluntary association of Massachusetts Application August 8, 1941, Serial No. 406,028
In Great Britain April 2, 1940

6 Claims. (Cl. 88—53)

This invention relates to improvements in ophthalmic mountings and more particularly to novel structural parts for such mountings.

One of the principal objects of the invention is to provide a novel construction of ophthalmic mounting which embodies parts of non-metallic material and parts of metallic material and relates particularly to a novel temple hinge connection.

Another object is to provide a simple and inexpensive hinge connection for connecting the temples with the front of a mounting formed particularly of non-metallic material.

Another object is to provide a novel temple hinge connection whereby the temples when extended will be more rigidly held against sagging or what is commonly known in the art as "drop temples."

Another object is to provide a construction of the above character with parts frictionally and adjustably engaged with each other.

Other objects and advantages of the invention will become apparent from the following description taken in connection with the accompanying drawing and it will be apparent that many changes may be made in the details of construction and arrangement of parts given without departing from the spirit of the invention as expressed in the accompanying claims. I, therefore, do not wish to be limited to the exact details of construction and arrangement of parts shown and described as the preferred form only has been given by way of illustration.

The forming, assembling and aligning of the several parts of ophthalmic mountings of the type disclosed have, in the past, introduced many manufacturing difficulties, particularly in the aligning and assembling of the temple hinge connections of such mountings. Such hinge connections were in most instances formed of two separate parts; one attached to the temples and the other attached to the front. In order to obtain the desired rigidity and durability, such parts usually had portions carefully machined to closely interfit with each other and were pivotally held in this relation. This required several accurate and costly operations in forming said parts and in most instances the resulting parts were bulky and unsightly in appearance.

Great care had to be taken when attaching the parts to the temples and fronts as slight inaccuracies as to positional relation thereof would cause the temples to be out of alignment, resulting in improper fitting on the face and improper supporting of the lenses before the eyes.

Another difficulty with many prior art constructions of this nature was that the temples soon became loose at their pivots and caused an undesirable condition to exist, commonly known in the art as drop temples.

The present invention overcomes all of these difficulties while providing a simple and inexpensive construction which constitutes the essence of this invention.

Referring to the drawing:

Figure I is a front elevation of the ophthalmic mounting embodying the invention.

Figure II is a top plan view of the ophthalmic mounting shown in Figure I.

Figure III is a partial side elevation of Figure I.

Figure IV is a fragmentary perspective view showing the temple hinge connection in assembled position.

Figure V is a sectional view taken as on line V—V of Figure IV.

Figure VI is a sectional view taken as on line VI—VI of Figure IV showing pivotal connection of hinge to front.

Figure VII is a view similar to Figure V showing a slightly modified construction.

Figure VIII shows the connecting hinge in its blanked out shape.

Figure IX shows the connecting hinge after being bent to its finished shape.

Referring more particularly to the drawing wherein like characters of reference designate like parts throughout the several views the ophthalmic mounting embodying the invention comprises broadly a pair of lens rims 1 having internal grooves for receiving suitable lenses 2 in the lens rims which, in this particular instance, are preferably formed of a non-metallic material such as Celluloid or synthetic resin joined by a bridge member 3 which may be formed either separately or integrally with the lens rims.

It is to be understood that the said rims and bridge may be formed of metal or other desirable materials.

The lens rims 1 are provided with temple lugs 4 on the temporal sides thereof to which suitable temples 5 are pivotally connected by hinge members 6. The temples 5 are preferably formed of non-metallic material similar to that of the lens rims 1 or bridge member 3. It is to be understood that they may be formed of metal or other suitable material if desired.

The hinge member 6 is preferably formed of flat sheet-like material 7, as illustrated in Figure VIII, by blanking or otherwise cutting the member 7 from said material. The member 7 comprises a connecting portion 8 having laterally disposed ears 9 adapted to be bent, as illustrated by the dash lines 9', to substantially right angle relation with the connection member 8. The ears 9 and the portion between said ears are then bent forwardly as illustrated at 10 in Figure IX.

It is to be understood that suitable connection openings 11 and 12 are formed by drilling, tapping and counter sinking in the portions 8 and 9 prior to bending the said ears 9. This permits these various operations to be done with greater ease.

The portion 8 of the hinge member 6 is adapted to overlie the inner side surface of the temple butt 13 with the deflected end 10 adapted to overlie the end 14 of said temple butt so as to abut against the lug 4 when the temple is fully open and is secured to said temple butt by spaced rivets or the like which extend through suitable openings formed in said temple butt 13 in alignment with the connection openings 11 in the member 8. The temples 5, in this particular instance, are preferably provided with an inner wire-like metallic core 16 which has a flattened end 17 adjacent the butt 13 through which the connection openings for the rivets or the like 15 extend. In the construction illustrated in Figure V the end of the flattened portion 17 lies beneath the deflected portion 10 of the hinge 6. In the construction illustrated in Figure VII, the portion 10 is provided with an opening of a contour shape substantially similar to that of the cross-sectional shape of the flattened portion 17 and the said portion 17 is adapted to extend through said opening and be headed over as illustrated at 18. In this construction, the portion 17 is attached to the deflected portion 10 of the hinge and is also connected by the rivets 15, which extend through spaced openings in said portion 17, to the portion 8 of the hinge member.

The ears 9 extend forwardly to form a bifurcated member between which the lugs 4 extend. The said lugs 4 and space between the ears 9 are so dimensioned that the parts have a relatively intimate fit with each other. The said lugs 4 and ears 9 have outer contour surfaces which lie substantially flush and blend with each other when the temples 5 are extended. The ears 9 are pivotally attached with the lugs 4 by a screw or other suitable connecting means 19 which extends through the openings 9 in the ears and through an aligned opening in the lugs 4. When the temples are extended, as illustrated in Figures II and III, the portion 10 engages the rear surface of the lugs 4 and controls the outer limit of the pivotal movement of the temples 5 on the pivot members 19. To increase the extent of the outer pivotal movement of the temples the material of the lugs 4 on the rear surfaces thereof may be removed as by filing or the like. Care is taken that the proper amount of material is removed to ensure the proper set back of the temples when the parts are initially fabricated and assembled with each other.

If desired, the ears 9 may be formed resilient and the initial set of said ears with respect to each other may be such that the space between them is less than the width of the lugs so that when the temples are attached to said lugs the ears initially have to be resiliently spread apart and will thereby maintain a slight frictional contact with said lugs when the temples are swung about the pivotal connections 19.

The lugs 4 may be located on an on-center position with respect to the lens rims, which on-center position, as known in the art, is located substantially at the point at which a horizontal line extending through the optical centers of the lenses intersects the lens rims or the said lugs may be located at a position on said lens rims above the useful field of side vision when the mounting is on the face.

It is to be understood that the assemblies of Figures I to IV inclusive may be constructed as illustrated in Figure V or as illustrated in Figure VII.

In order to ensure a smooth pivotal action the upper and lower surfaces of the lugs 4 are preferably formed in parallel relation with each other and the ears 9 are also in substantially parallel relation. This ensures a relatively smooth side surface contact between the ears 9 and lugs 4.

If desired, the butt 13 of the temples 5 may be recessed on the inner surface thereof and the portion 8 of the hinge may be fitted within said recess.

It is to be understood, of course, that the depth of the recess is such that the inner surface of the portion 8 will lie substantially flush with the inner surface of the butt 13 and that the butt 13 is of a thickness sufficient to cause the outer surface thereof to lie substantially flush with the adjacent edge of the portion 10.

The metallic cores 16 may also be omitted, if desired.

From the foregoing description it will be seen that simple, efficient and economical means have been provided for accomplishing all of the objects and advantages of the invention.

I claim:

1. A lens supporting structure for the lenses of an ophthalmic mounting comprising lens holding means each having an integral temple connection lug extending outwardly to one side thereof substantially in the plane of said lens holding means, said lugs each having spaced upper and lower bearing surfaces and a connection opening therein extending through said surfaces, temples, and hinge members pivotally joining said temples with said connection lugs, said hinge members each comprising a plate-like portion secured in side surface relation with the temple adjacent the forward end thereof and having a portion deflected to overlie the end surface of said temple and spaced bearing members deflected sidewise and forwardly of said portion overlying the end of the temple shaped to overlie the upper and lower bearing surfaces of said integral connection lug, said spaced bearing members each having an opening therein aligned with the connection opening in the lug and means in said aligned openings for pivotally connecting said spaced bearing members to said connection lug.

2. An ophthalmic mounting comprising a pair of lenses, lens holding means on said lenses each having an integral temple connection lug extending outwardly to one side thereof substantially in the plane of said lens holding means, said lugs each having spaced upper and lower bearing surfaces and a connection opening therein extending through said surfaces, temples, and hinge members pivotally joining said temples with said connection lugs, said hinge members each comprising a plate-like portion secured in side surface relation with the temple adjacent the forward end thereof and having a portion deflected to overlie the end surface of said temple and spaced bearing members deflected sidewise and forwardly of said portion overlying the end of the temple shaped to overlie the upper and lower bearing surfaces of said integral connection lug, said spaced bearing members each having an opening therein aligned with the connection opening in the lug and means in said aligned openings for pivotally connecting said spaced bearing members to said connection lug.

3. A lens supporting structure for the lenses of an ophthalmic mounting comprising lens holding means each having an integral temple connection lug extending outwardly to one side thereof substantially in the plane of said lens holding means, said lugs each having spaced upper and lower bearing surfaces and a connection opening therein extending through said surfaces, temples, and hinge members pivotally joining said temples with said connection lugs, said hinge members each comprising a main plate-like portion secured in side surface relation with the inner surface of the temple adjacent the forward end thereof and having a portion deflected to one side of said main plate-like portion and overlying the end of the temple, said portion overlying the end of the temple having spaced bearing members deflected in a direction forwardly thereof and extending transversely of the plane of the main plate-like portion to the side of said main plate-like portion opposite said portion deflected to overlie the end of the temple and having connection openings therein aligned with the connection opening in the lug and means in said aligned openings for pivotally connecting said spaced bearing members to said connection lug.

4. An ophthalmic mounting comprising a pair of lenses, lens holding means on said lenses each having an integral temple connection lug extending outwardly to one side thereof substantially in the plane of said lens holding means, said lugs each having spaced upper and lower bearing surfaces and a connection opening therein extending through said surfaces, temples and hinge members pivotally joining said temples with said connection lugs, said hinge members each comprising a main plate-like portion secured in side surface relation with the inner surface of the temple adjacent the forward end thereof and having a portion deflected to one side of said main plate-like portion and overlying the end of the temple, said portion overlying the end of the temple having spaced bearing members deflected in a direction forwardly thereof and extending transversely of the plane of the main plate-like portion to the side of said main plate-like portion opposite said portion deflected to overlie the end of the temple and having connection openings therein aligned with the connection opening in the lug and means in said aligned openings for pivotally connecting said spaced bearing members to said connection lug.

5. A lens supporting structure for the lenses of an ophthalmic mounting comprising lens holding means each having an integral temple connection lug extending outwardly to one side thereof substantially in the plane of the lens holding means, said lugs each having spaced upper and lower bearing surfaces and a front surface of a given contour shape, said lugs each having a connection opening therein extending through said upper and lower surfaces, temples, and hinge members joining said temples with said connection lugs, said hinge members each comprising a main plate-like portion secured in side surface relation with the inner surface of the temple adjacent the forward end thereof and having a portion deflected to one side of said main plate-like portion and overlying the forward end of the temple, said portion overlying the adjacent forward end of the temple having spaced bearing members deflected forwardly and extending from said forwardly deflected portions transversely of the plane of the main plate-like portion to the side thereof opposite the portion overlying the end of the temple and terminating in ends having connection openings therein, said openings being adapted to be aligned with the connection opening in the lug and means in said aligned openings for pivotally connecting said spaced bearing members to said connecting lug, said spaced bearing members each having a forward edge of a contour shaped substantially the same as the contour of the front surface of the lug.

6. An ophthalmic mounting comprising a pair of lenses, lens holding means on said lenses each having an integral temple connection lug extending outwardly to one side thereof substantially in the plane of said lens holding means, said lugs each having spaced upper and lower bearing surfaces, a front surface of given contour shape and a connection opening therein extending through said upper and lower surfaces, temples, and hinge members pivotally joining said temples with said connection lugs, said hinge members each comprising a main plate-like portion secured in side surface relation with the inner surface of the temple adjacent the forward end thereof and having a portion deflected to one side of said main plate-like portion and overlying the forward end of the temple, said portion overlying the adjacent forward end of the temple having spaced bearing members deflected forwardly and extending from said forwardly deflected portions transversely of the plane of the main plate-like portion to the side thereof opposite the portion overlying the end of the temple and terminating in ends having connection openings therein, said openings being adapted to be aligned with the connection opening in the lug and means in said aligned openings for pivotally connecting said spaced bearing members to said connecting lug, said spaced bearing members each having a forward edge of a contour shaped substantially the same as the contour of the front surface of the lug.

ROBERT JAMES FLEMING.